United States Patent
Khan et al.

(10) Patent No.: US 8,582,535 B2
(45) Date of Patent: Nov. 12, 2013

(54) APPARATUS AND METHOD FOR SCHEDULING HYBRID ARQ ACKNOWLEDGMENT MESSAGES IN A WIRELESS NETWORK

(75) Inventors: Farooq Khan, Allen, TX (US); Jiann-An Tsai, Plano, TX (US)

(73) Assignee: Samsung Electronics Co. Ltd., Suwon-si (KR)

( * ) Notice: Subject to any disclaimer, the term of this patent is extended or adjusted under 35 U.S.C. 154(b) by 1394 days.

(21) Appl. No.: 11/708,306

(22) Filed: Feb. 20, 2007

(65) Prior Publication Data

US 2007/0254662 A1    Nov. 1, 2007

Related U.S. Application Data

(60) Provisional application No. 60/796,332, filed on Apr. 28, 2006, provisional application No. 60/795,953, filed on Apr. 28, 2006.

(51) Int. Cl.
*H04W 4/00*    (2009.01)

(52) U.S. Cl.
USPC ........... 370/332; 370/330; 370/431; 455/464; 455/509; 455/450; 455/451; 455/452.1; 455/452.2

(58) Field of Classification Search
USPC .......... 370/330, 431; 455/464, 509, 450, 451, 455/452.1, 452.2
See application file for complete search history.

(56) References Cited

U.S. PATENT DOCUMENTS

| | | | |
|---|---|---|---|
| 2004/0116143 A1* | 6/2004 | Love et al. | 455/522 |
| 2005/0084000 A1* | 4/2005 | Krauss et al. | 375/148 |
| 2005/0143114 A1* | 6/2005 | Moulsley et al. | 455/522 |
| 2005/0249127 A1* | 11/2005 | Huo et al. | 370/252 |
| 2009/0047912 A1* | 2/2009 | Lee et al. | 455/69 |

* cited by examiner

*Primary Examiner* — Justin Lee

(57) ABSTRACT

A base station for use in wireless network that communicating with subscriber stations according to a multicarrier protocol. The base station receives uplink signals transmitted by the subscriber stations and measures the channel quality of each uplink acknowledgment signal channel. The base station transmits to a first subscriber station a control message that assigns the first subscriber station to transmit a first acknowledgment signal in a first selected uplink acknowledgment signal channel. The base station selects the first selected uplink acknowledgment signal channel based on a first measured channel quality associated with the first selected uplink acknowledgment signal channel.

23 Claims, 17 Drawing Sheets

APPARATUS AND METHOD FOR SCHEDULING HYBRID ARQ ACKNOWLEDGMENT MESSAGES IN A WIRELESS NETWORK

CROSS-REFERENCE TO RELATED APPLICATION AND CLAIM OF PRIORITY

This application is related to U.S. Provisional Patent No. 60/796,332, filed Apr. 28, 2006, entitled "Hybrid ARQ Feedback In A Wireless Communication System" and to U.S. Provisional Patent No. 60/795,953, filed Apr. 28, 2006, entitled "Hybrid ARQ ACK/NACK Scheduling In A Wireless Communication System". Provisional Patent Nos. 60/796,332 and 60/795,953 are assigned to the assignee of this application and are incorporated by reference as if fully set forth herein. This application hereby claims priority under 35 U.S.C. §119(e) to Provisional Patent Nos. 60/796,332 and 60/795,953.

This application is related to U.S. patent application Ser. No. 11/390,056, entitled "System And Method For Dynamic Allocation Of ARQ Feedback In A Multi-Carrier Wireless Network", filed Mar. 27, 2006. application Ser. No. 11/390,056 is assigned to the assignee of this application and is hereby incorporated by reference as if fully set forth herein.

TECHNICAL FIELD OF THE INVENTION

The present application relates generally to wireless communications and, more specifically, to a technique for scheduling hybrid ARQ ACK/NACK messages in a multicarrier network.

BACKGROUND OF THE INVENTION

Orthogonal frequency division multiplexing (OFDM) is a multi-carrier transmission technique in which a user transmits on many orthogonal frequencies (or subcarriers). The orthogonal subcarriers are individually modulated and separated in frequency such that they do not interfere with one another. This provides high spectral efficiency and resistance to multipath effects. An orthogonal frequency division multiple access (OFDMA) system allows some subcarriers to be assigned to different users, rather than to a single user. Today, OFDM and OFDMA techniques are used in both wireline transmission systems and wireless transmission systems.

In conventional OFDM/OFDMA networks, a dedicated resource is allocated to each subscriber station (e.g., mobile device, wireless terminal, etc.) for ARQ feedback or hybrid ARQ feedback, such as an acknowledgment (ACK) message or a negative acknowledgment (NACK) message. By way of example, a transmitter (e.g., base station) in an OFDM network sends data packets and control information to a receiver (e.g., subscriber station). The control channel carries information specifying, for example, the sequence number and modulation and coding scheme used to encode the packets. The subscriber station tries to decode the packets and transmits to the base station in the ACK/NACK channel a feedback message regarding a successful or an unsuccessful transmission.

In conventional systems, the ACK/NACK signal is time-multiplexed within a subframe of the uplink or reverse channel (i.e., from subscriber station to base station) using a very short transmission duration. However, an ACK/NACK signal transmitted for only a short duration carries only a small amount of energy. Also, since a conventional network uses dedicated resources (i.e., time-frequency slots) to transmit ACK/NACK messages, the ACK/NACK channels are allocated without considering the instantaneous channel quality of the ACK/NACK channels. This results in very high bit error rate (BER) in the ACK/NACK channel, thereby resulting in limited system throughput and coverage.

Therefore, there is a need for improved OFDM/OFDMA systems that maximize throughput and coverage. In particular, there is a need for improved OFDM/OFDMA systems that transmit ACK/NACK signals in the uplink with a lower bit error rate.

SUMMARY OF THE INVENTION

In one embodiment of the disclosure, a base station is provided for use in wireless network capable of communicating with a plurality of subscriber stations according to a multicarrier protocol. The base station is operable to receive uplink signals transmitted by the plurality of subscriber stations and to measure therein the channel quality of each of a plurality of uplink acknowledgment signal channels. The base station is further operable to transmit to a first subscriber station a control message operable to assign the first subscriber station to transmit a first acknowledgment signal in a first selected one of the uplink acknowledgment signal channels. The base station selects the first selected uplink acknowledgment signal channel based on a first measured channel quality associated with the first selected uplink acknowledgment signal channel.

In another embodiment, a first communication device is provided that transmits a first message in a forward channel to a second communication device and receives multicarrier signals in a reverse channel from other communication devices. The reverse channel comprises a plurality of time slots, each of the time slots comprising up to N subcarriers transmitted by the other communication devices. The first communication device is operable to measure the channel quality of each of a plurality of acknowledgment signals transmitted by the other communication devices. The first communication device is further operable to transmit to the second communication device a control message that assigns the second communication device to transmit a first acknowledgment signal on a first selected subcarrier in a first time slot of the reverse channel and on a second selected subcarrier in a second time slot of the reverse channel.

In still another embodiment, a base station is provided for use in a wireless network that communicates with a plurality of subscriber stations according to an orthogonal frequency multiple access (OFDMA) protocol. The base station receives in an uplink channel an uplink subframe comprising OFDMA subcarriers transmitted by the plurality of subscriber stations in a plurality of long time slots and a plurality of short time slots of the uplink subframe. Each of the long time slots comprises up to N OFDMA subcarriers transmitted by the plurality of subscriber stations. The base station measures the quality of each of a plurality of pilot signals in the uplink subframe and transmits to a first subscriber station a control message operable to assign the first subscriber station to transmit a first acknowledgment signal on a first selected OFDMA subcarrier in a first long time slot of the uplink subframe and on a second selected OFDMA subcarrier in a second long time slot of the uplink subframe. The first and second selected OFDMA subcarriers are selected by the base station based on the measured quality associated with at least one of the plurality of pilot signals.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 16, discussed herein, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The present disclosure describes a frequency-multiplexing approach for the ACK/NACK channel in an OFDM or DFT-spread OFDM system. The disclosed frequency-multiplexing approach enables ACK/NACK signal transmission over a longer duration and therefore allows the ACK/NACK signal to carry more energy. The higher transmitted energy on the ACK/NACK channel improves ACK/NACK signal reception and thereby improves system coverage and throughput.

The transmission technique disclosed herein may advantageously be embodied in a wireless network that dynamically allocates resources to hybrid Acknowledgement Request (ARQ) messages according to the disclosure in U.S. patent application Ser. No. 11/390,056, incorporated by reference above. Thus, a resource (e.g., communication channel) allocated to an ACK/NACK message may be dynamically identified in a control channel message accompanying the data packet or data subpacket transmission from the transmitting device (e.g., a base station). The receiving device (e.g., a subscriber station) then sends an ACK or NACK message informing the transmitting device about the successful or unsuccessful transmission of the packet. The ACK/NACK is sent using the resource identified in the control channel message sent by the transmitting device.

Moreover, the disclosed transmission technique may be embodied in a wireless network that use Fourier Transform pre-coding to reduce the peak-to-average power (PAPR) ratio according to the disclosure in U.S. patent application Ser. No. 11/374,928, entitled "Apparatus And Method For FT Pre-Coding Of Data To Reduce PAPR In A Multi-Carrier Wireless Network" and filed on Mar. 14, 2006. Application Ser. No. 11/374,928 is assigned to the assignee of this application and is hereby incorporated by reference as if fully set forth herein.

In the descriptions that follow, it shall be assumed generally that transmitters and receivers are operating in OFDMA mode. However, this embodiment should not be construed to limit the scope of the disclosure. In alternate embodiments, the transmitters and receivers may operate in OFDM mode or another multi-carrier mode without departing from the principles of the disclosure.

Figure 1:
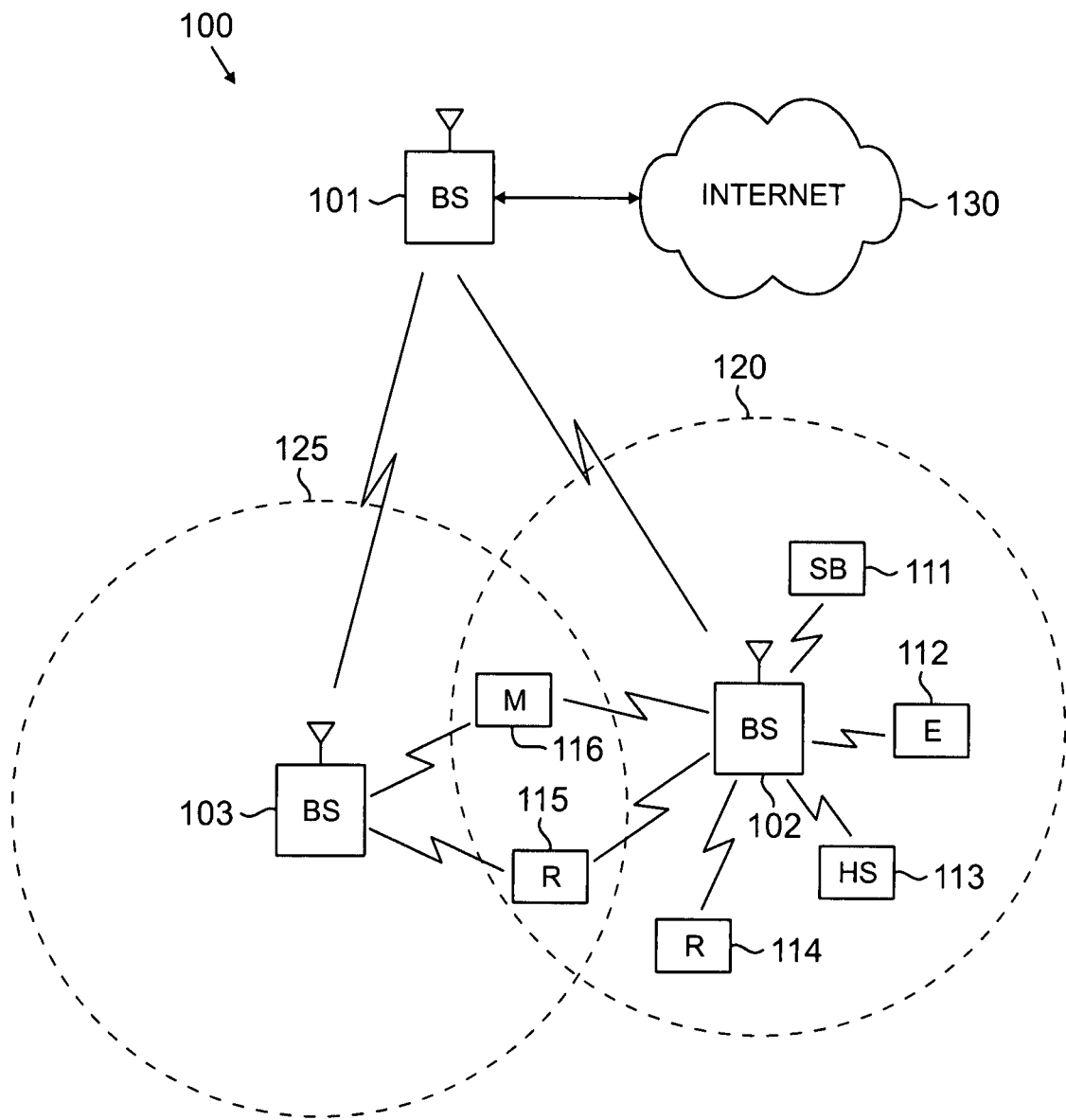
FIG. 1 illustrates an exemplary wireless network that transmits ACK/NACK messages in the uplink according to the principles of the present disclosure.

FIG. 1 illustrates exemplary wireless network 100, which transmits ACK/NACK messages according to the principles of the present disclosure. In the illustrated embodiment, wireless network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based network (not shown).

Base station 102 provides wireless broadband access (via base station 101) to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Base station 101 may be in communication with either a greater number or a lesser number of base stations. Furthermore, while only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
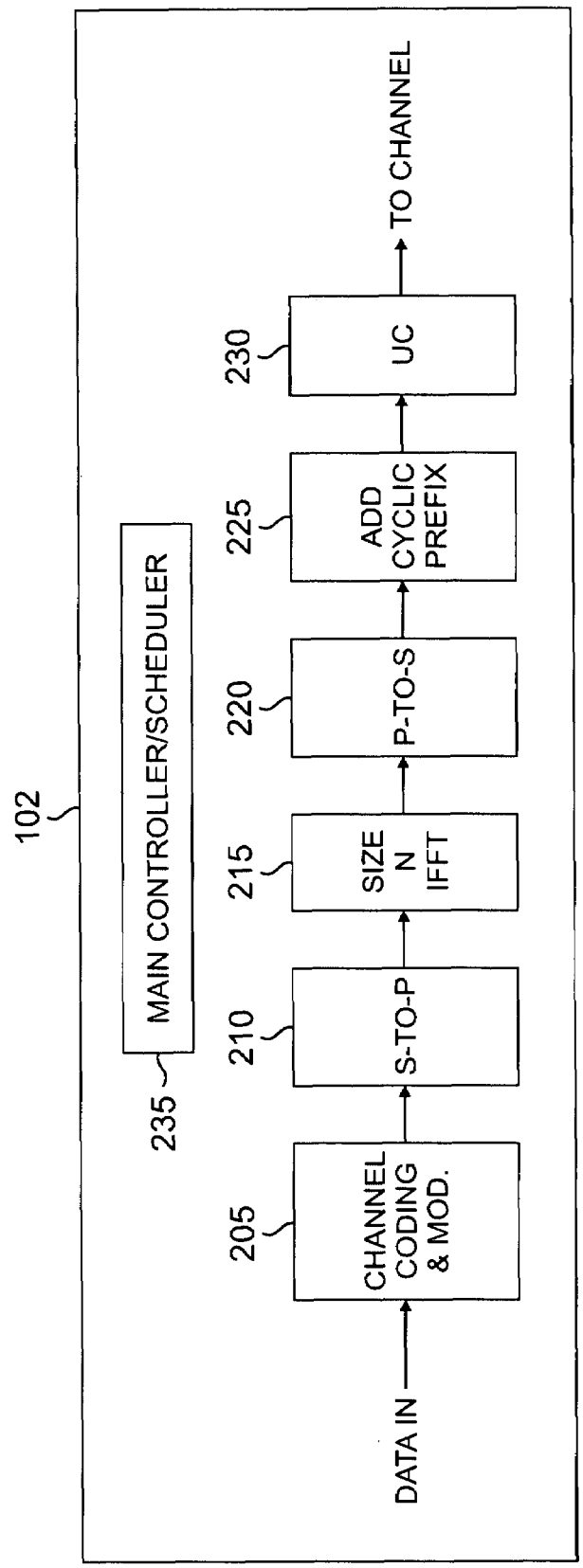
FIG. 2A is a high-level diagram of an OFDMA transmitter according to one embodiment of the present disclosure.
Figure 2B:
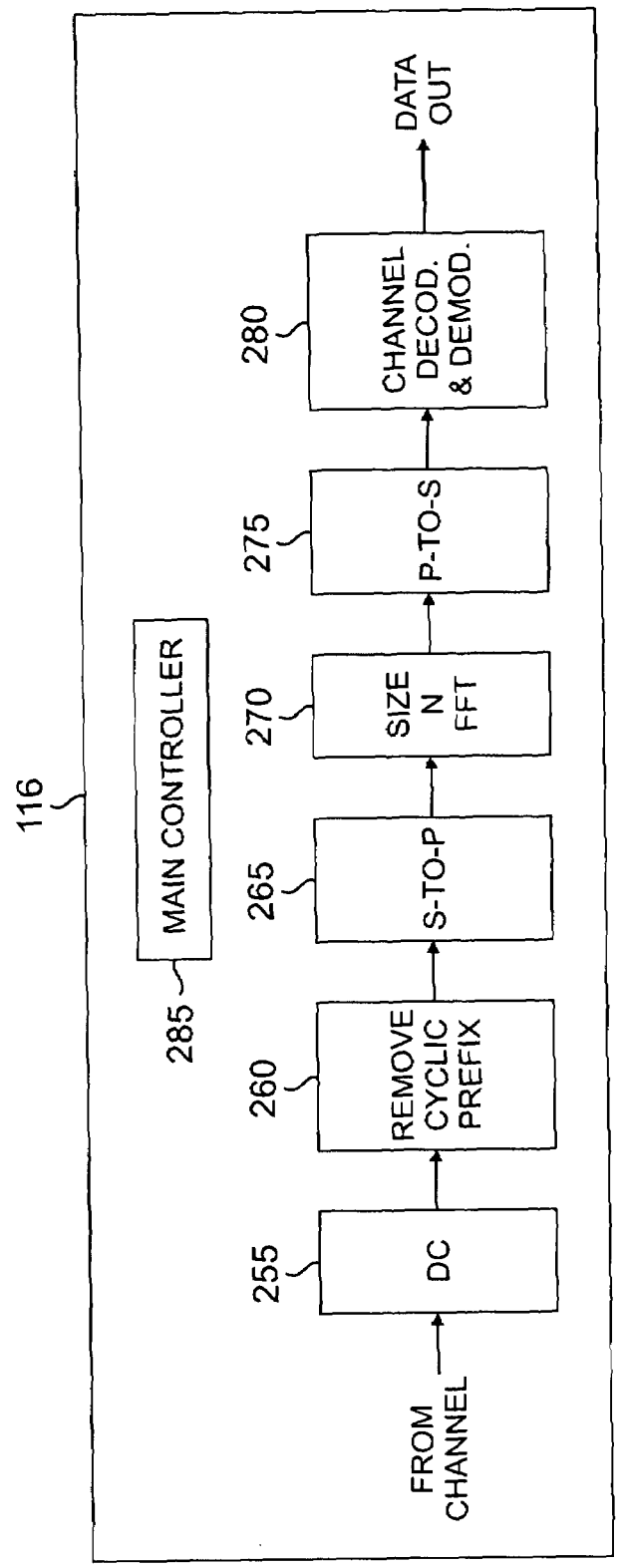
FIG. 2B is a high-level diagram of an OFDMA receiver according to one embodiment of the present disclosure.

FIG. 2A is a high-level diagram of an orthogonal frequency division multiple access (OFDMA) transmit path. FIG. 2B is a high-level diagram of an orthogonal frequency division multiple access (OFDMA) receive path. In FIGS. 2A and 2B, the OFDMA transmit path is implemented in base station (BS) 102 and the OFDMA receive path is implemented in subscriber station (SS) 116 for the purposes of illustration and explanation only. However, it will be understood by those skilled in the art that the OFDMA receive path may also be implemented in BS 102 and the OFDMA transmit path may be implemented in SS 116.

The transmit path in BS 102 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230, and main controller and scheduler 235 (hereafter, simply main controller 235). The receive path in SS 116 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280, and main controller 285.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., QPSK, QAM) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

The transmit path and receive path components described herein and illustrated in FIGS. 2A and 2B are configurable devices that may be re-programmed and controlled by main controller 235 in BS 102 or main controller 285 in SS 116. Thus, for example, main controller 235 is operable to configure modulation block 205 to adapt to different modulation techniques (e.g., BPSK, QPSK, QAM, etc.). Similarly, main controller 285 is operable to similarly configure demodulation block 280. Main controllers 235 and 285 are also operable to modify the value of Size N.

Each of base stations 101-103 may implement a transmit path that is analogous to transmitter 200 for transmitting in the downlink to subscriber stations 111-116 and may implement a receive path that is analogous to receiver 250 for receiving in the uplink from subscriber stations 111-116. Similarly, each one of subscriber stations 111-116 may implement a transmit path corresponding to the architecture of transmitter 200 for transmitting in the uplink to base stations 101-103 and may implement a receive path corresponding to the architecture of receiver 250 for receiving in the downlink from base stations 101-103.

There may be a large number of subscriber stations present in wireless network 100. Due to the bursty nature of data traffic, typically only a few subscriber stations are scheduled to receive a transmission at a given time. A mechanism for dynamic allocation of ACK/NACK channels was disclosed in U.S. patent application Ser. No. 11/390,056, which was incorporated by reference above. Main controllers 235 and 285 are operable to allocate uplink channel resources to subscriber stations 111-116 as described in U.S. patent application Ser.

No. 11/390,056. In one embodiment of the present disclosure, each one of base stations 101-103 is capable of dynamically allocating uplink channel resources to subscriber stations 111-116 according to the number of subscriber stations that will be receiving downlink data transmissions and will be required therefore to send ACK or NACK messages (and associated pilot signals) back to a transmitting base station. The uplink channel resources may be independently and selectively allocated for each transmission, rather than being permanently dedicated to particular subscriber stations.

Figure 3:
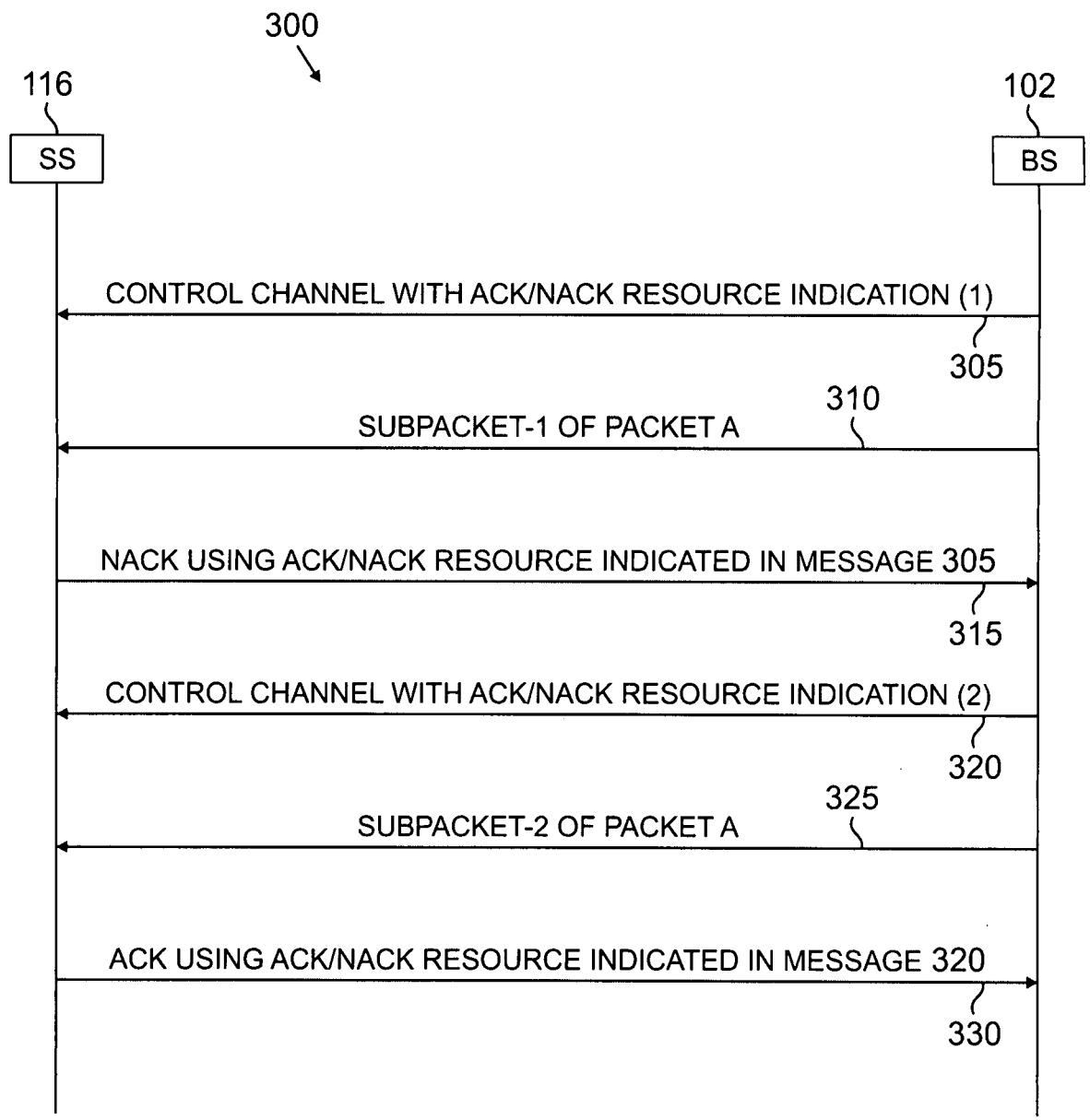
FIG. 3 is a message flow diagram illustrating hybrid ARQ messages according to one embodiment of the disclosure.

FIG. 3 depicts message flow diagram 300, which illustrates hybrid ARQ messages according to an exemplary embodiment of the present disclosure. Base station (BS) 102 transmits control channel message 305 to subscriber station (SS) 116 at the same time that BS 102 transmits data message 310. Control channel message 305 contains ACK/NACK Resource Indication (1), which indicates or identifies the uplink channel resources (i.e., subcarriers and time slots) that SS 116 is to use to transmit back an ACK message or a NACK message and pilot signals. Data message 310 contains Subpacket 1 of Packet A. Assuming Subpacket 1 of Packet A is not properly decoded, SS 116 responds by transmitting NACK message 315 using the uplink channel resources indicated in message 305 for sending ACK messages and NACK messages.

BS 102 then transmits control channel message 320 to SS 116 at the same time that BS 102 transmits data message 325. Control channel message 320 contains ACK/NACK Resource Indication (2), which indicates or identifies the uplink channel resources (i.e., subcarriers and time slots) that SS 116 is to use to transmit an ACK message or a NACK message and pilot signals. ACK/NACK Resource Indication (2) in message 320 may be the same as ACK/NACK Resource Indication (1) in message 305, or it may be different.

If wireless network 100 implements a hybrid ARQ protocol, data message 325 contains Subpacket 2 of Packet A. SS 116 will combine Subpacket 1 and Subpacket 2 in order to attempt to decode Packet A. Assuming SS 116 is able to decode Packet A from Subpacket 1 and Subpacket 2, SS 116 responds by transmitting ACK message 330 using the uplink channel resources indicated in message 320 for sending ACK messages and NACK messages.

By way of example, if wireless network 100 uses turbo coding in the downlink, Subpacket 1 may comprise i) the systematic data applied to the turbo encoder, and ii) a first portion of the parity data generated by the turbo encoder. Subpacket 2 may comprise the remaining portion of the parity data generated by the turbo decoder. If the systematic bits and the first portion of parity bits in Subpacket 1 cannot be used to recover all of Packet A, then the turbo decoder in SS 116 combines the remaining portion of parity bits in Subpacket 2 with the systematic bits and the first portion of parity bits in Subpacket 1 to recover Packet A.

In an exemplary embodiment, the ACK/NACK feedback may be a two-state signal (i.e., +1 for ACK, −1 for NACK). Alternatively, the ACK/NACK feedback may be three-state signal (i.e., +1 for ACK, −1 for NACK, or 0 for DTX). In the three-state ACK/NACK feedback, the receiver also needs to differentiate the no transmission (DTX) state from ACK and NACK state. Therefore, for the same bit error (BER) performance, the energy required for three-state feedback is larger than two-state feedback.

Figure 4:
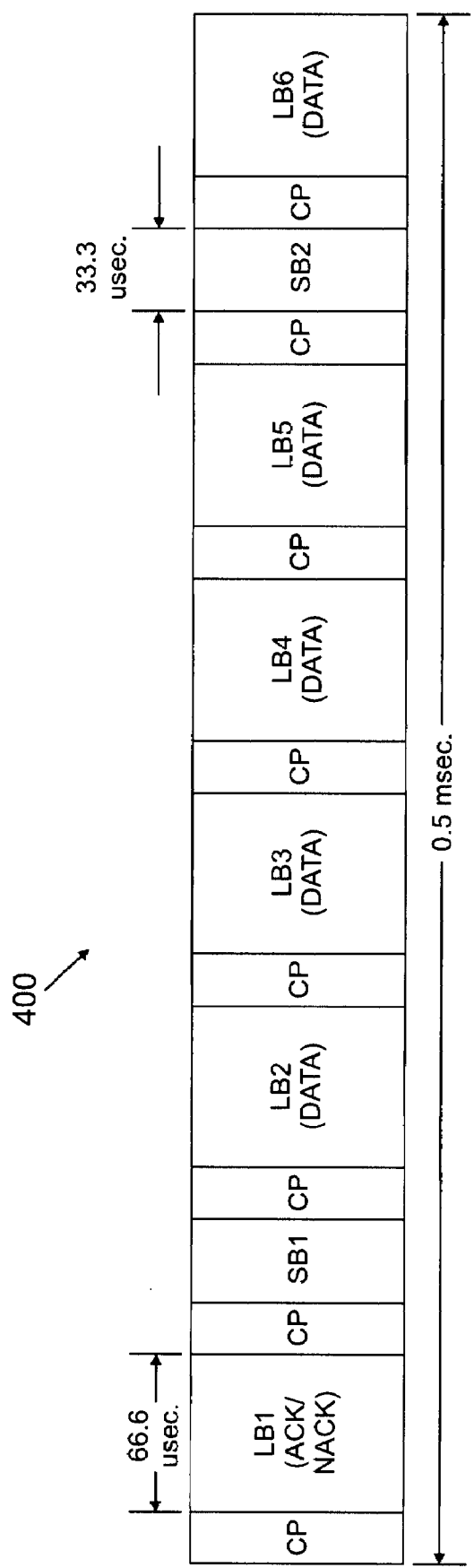
FIG. 4 illustrates an uplink subframe according to one embodiment of the prior art.

FIG. 4 illustrates an uplink subframe according to one embodiment of the prior art. The uplink subframe transmits control information and user data from the subscriber station to the base station. The exemplary subframe has a length of 0.5 milliseconds (msec.) and is divided into a plurality of time slots. The time slots comprise six long blocks (LB1-LB6) and two short blocks (SB1 and SB2). Each one of long blocks LB1-LB2 has a length of 66.6 microseconds (usec.). Each one of short blocks SB1 and SB2 has a length of 33.3 microseconds. A cyclic prefix (CP) is added to each of LB1-LB6 and SB1 and SB2.

In a conventional system, short blocks SB1 and SB2 carry the pilot signal for channel estimation while long blocks LB2-LB6 carry the data symbols. However, conventional wireless networks uses long block LB1 to carry the entire ACK/NACK signal. For a given transmit power of P watts and a time of T=66.6 microseconds, the total transmitted energy for the ACK/NACK signal in long block LB1 is only P×T Joules.

Figure 5:
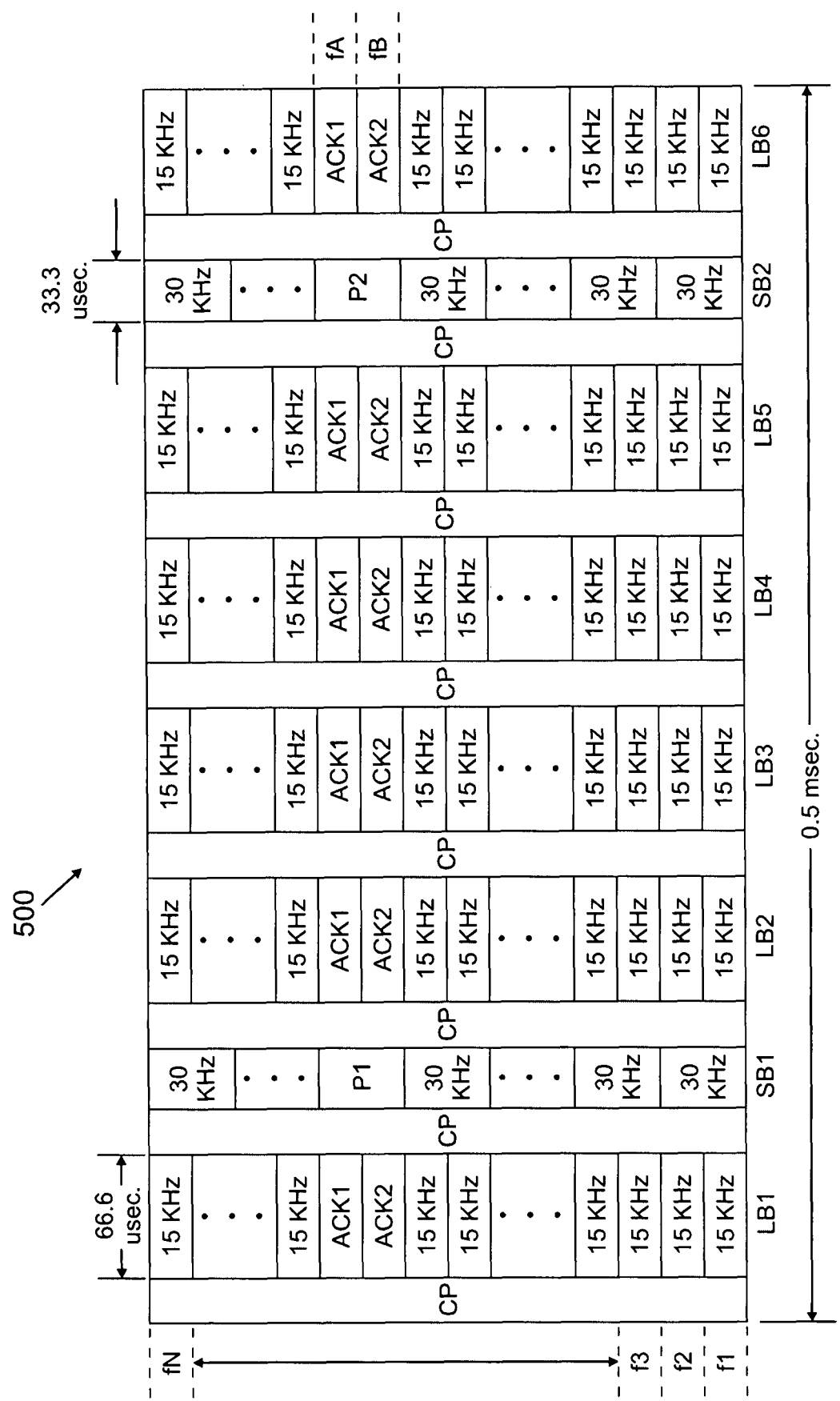
FIG. 5 illustrates an uplink subframe according to one embodiment of the present disclosure.

FIG. 5 illustrates uplink frame 500 according to one embodiment of the present disclosure. As in the prior art example in FIG. 4, uplink frame 500 has a length of 0.5 milliseconds and comprises a plurality of time slots, namely long blocks (LBs) and short blocks (SBs). In particular, uplink frame 500 comprises six long blocks (LB1-LB6) and two short blocks (SB1 and SB2). Each one of long blocks LB1-LB2 has a length of 66.6 microseconds. Each one of short blocks SB1 and SB2 has a length of 33.3 microseconds. A cyclic prefix (CP) is added to each of LB1-LB6, SB1 and SB2.

In the example in FIG. 5, each symbol in long blocks LB1-LB6 comprises N subcarriers (or tones). The 512 subcarriers are labeled f1 through fN. In an exemplary embodiment, N=512 subcarriers and the subcarrier spacing in long blocks LB1-LB6 is 15 KHz. Each symbol in short blocks SB1 and SB2 comprises N/2 subcarriers (or tones) and the subcarrier spacing in short blocks SB1 and SB2 is 30 KHz. Each subcarrier in short blocks SB1 and SB2 occupies the same spectrum as two subcarriers in one of long blocks LB1-LB6. Thus, the first subcarrier in short block SB1 or SB2 occupies the same spectrum as subcarriers f1 and f2 in long blocks LB1-LB6, the second subcarrier in short block SB1 or SB2 occupies the same spectrum as subcarriers f3 and f4 in long blocks LB1-LB6, the third subcarrier in short block SB1 or SB2 occupies the same spectrum as subcarriers f5 and f6 in long blocks LB1-LB6, and so forth. Finally, the last (or N/2) subcarrier in short block SB1 or SB2 occupies the same spectrum as subcarriers f(N−1) and fN in long blocks LB1-LB6.

According to the principles of the present disclosure, the uplink ACK/NACK channel structure uses a frequency-multiplexing approach. In FIG. 5, the ACK/NACK channels are carried on a pair of subcarriers. A first ACK/NACK signal (or ACK1) is transmitted on subcarrier fA. A second ACK/NACK signal (or ACK2) is transmitted on subcarrier fB. Each one of the ACK1 signal and the ACK2 signal comprises six symbols, with one symbol per long block (LB) and each long block time slot having a duration T=66.6 microseconds. By way of example, the ACK1 signal is carried on the fA subcarrier in each one of long blocks LB1-LB6 and the ACK2 signal is carried on the fB subcarrier in each one of long blocks LB1-LB6. Thus, the total energy that can be carried for a given transmit power P is 6×P×T Joules.

The ACK1 signal carried over the fA subcarriers uses the pilot signal P1 transmitted in short block SB1, while the ACK2 signal carried over the fB subcarriers uses the pilot signal P2 transmitted in short block SB2. Pilot signal P1 uses subcarriers fA and fB in short block SB1 and pilot signal P2 uses subcarriers fA and fB in short block SB2. Since the pilot signals P1 and P2 use the same subcarriers as the ACK1 and ACK 2 signals, reliable channel estimates may be obtained for demodulation of the ACK1 and ACK 2 signals.

Figure 6:
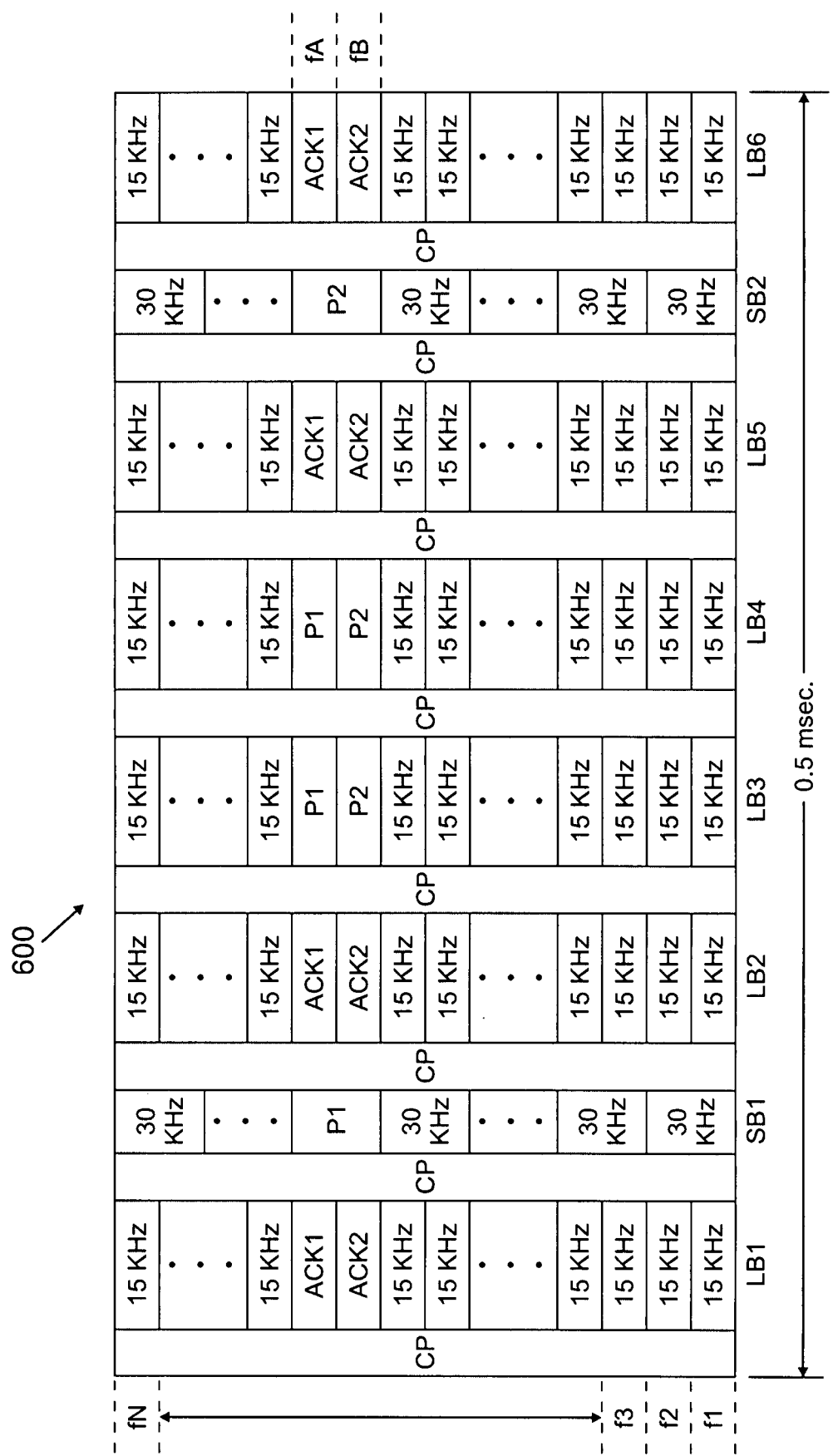
FIG. 6 illustrates an uplink subframe according to another embodiment of the present disclosure.

FIG. 6 illustrates uplink frame 600 according to another embodiment of the present disclosure. In FIG. 6, additional pilot P1 and P2 symbols for each of the ACK1 and ACK2 channels are also carried in two long blocks (i.e., LB3 and LB4) in addition to the pilot P1 and P2 symbols carried in short blocks SB1 and SB2. In this embodiment, a total of 4 symbols are used for each ACK signal and 3 symbols for each pilot signal. The additional pilot symbols allow for better channel estimation for demodulation of the ACK signals.

Figure 7:
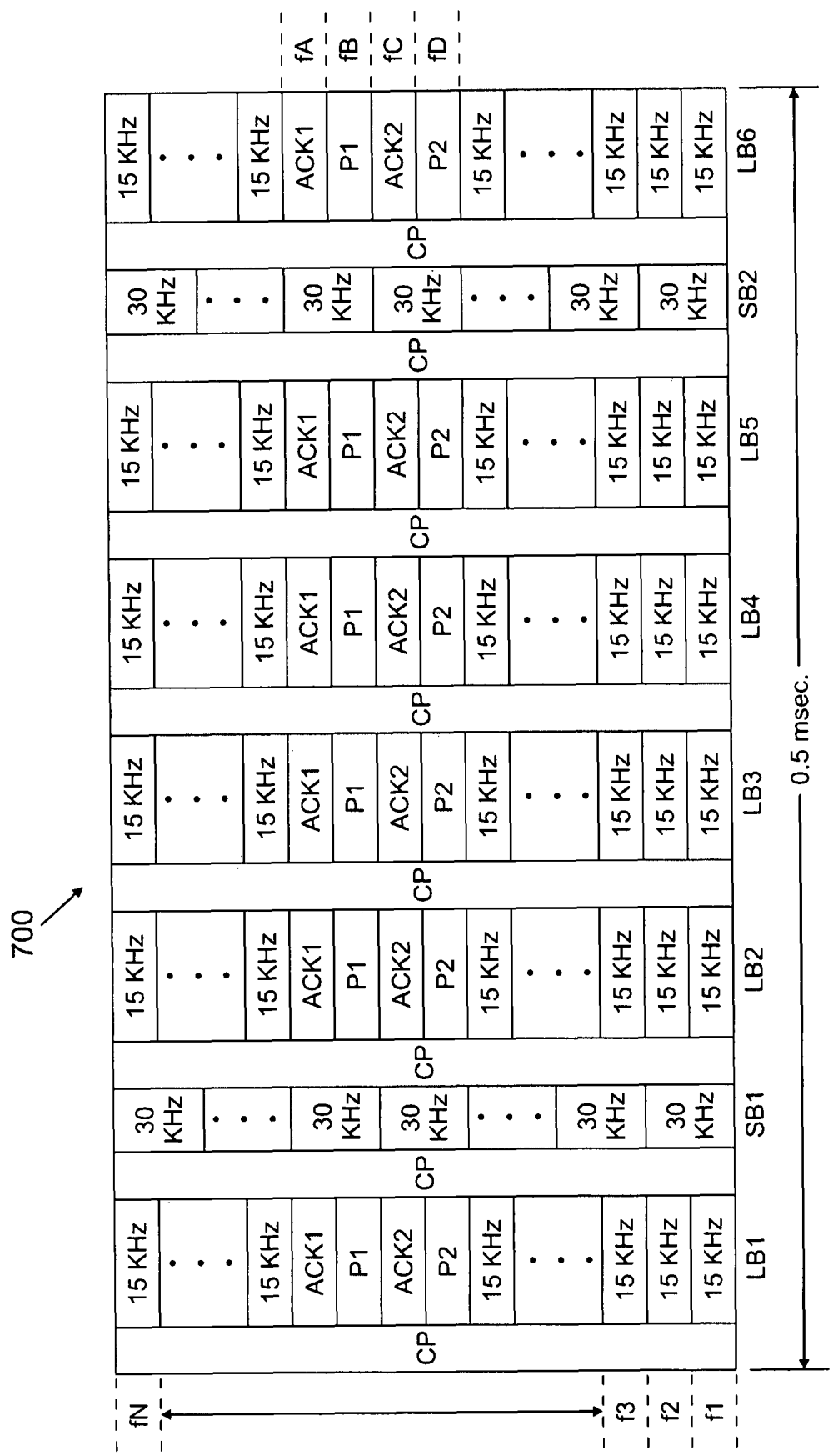
FIG. 7 illustrates an uplink subframe according to another embodiment of the present disclosure.

FIG. 7 illustrates uplink frame 700 according to another embodiment of the present disclosure. In FIG. 7, pilot signals are carried on the subcarrier adjacent to the ACK/NACK signal subcarrier over the six long blocks. By way of example, the ACK1 signal is carried on subcarrier fA in each of long blocks LB1-LB6 and the corresponding pilot signal P1 is carried on subcarrier fB adjacent to subcarrier fA. Similarly, the ACK2 and pilot P2 signals are carried on adjacent subcarriers fC and fD in each of long blocks LB1-LB6.

Figure 8:
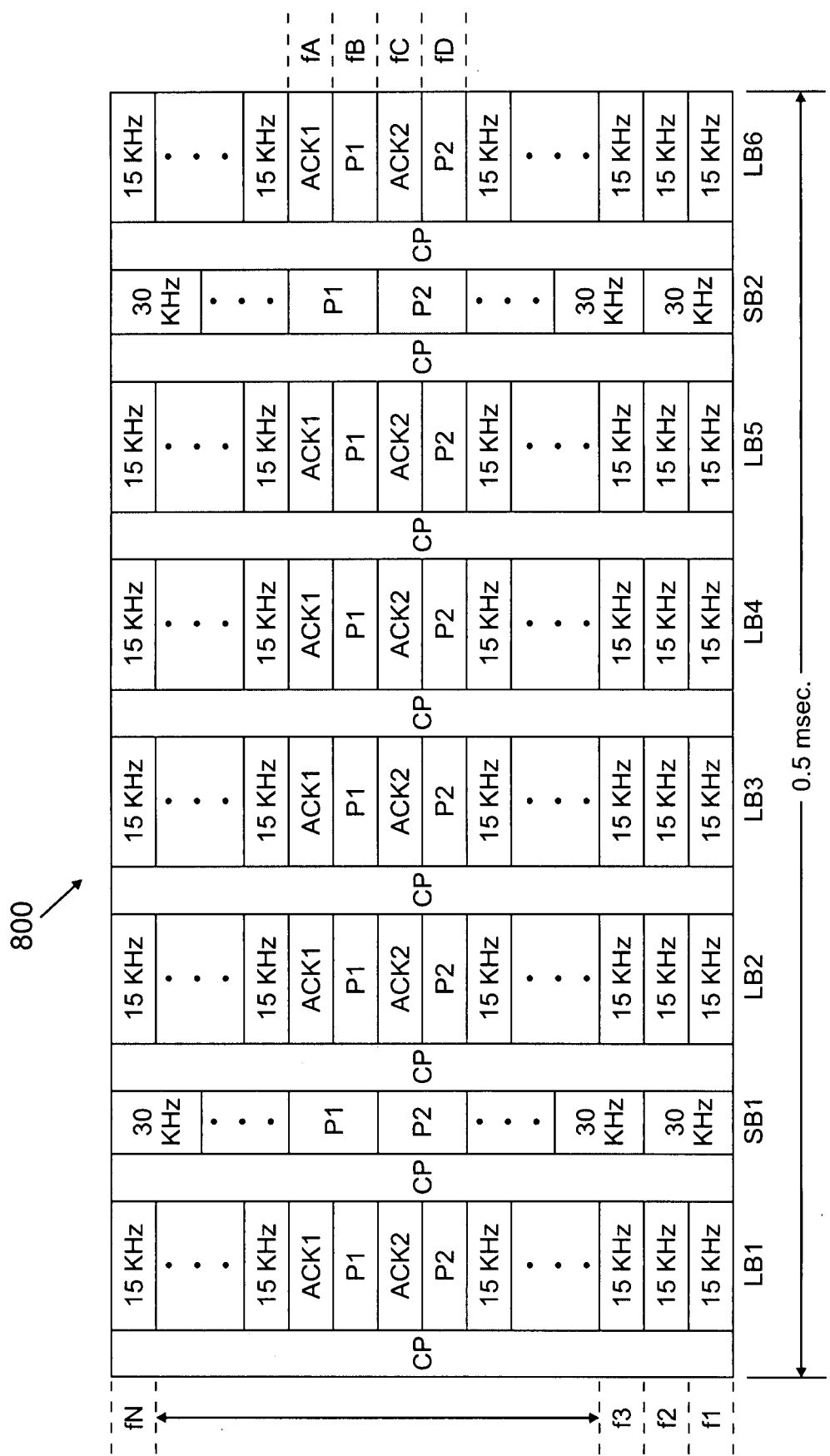
FIG. 8 illustrates an uplink subframe according to another embodiment of the present disclosure.

FIG. 8 illustrates uplink frame 800 according to another embodiment of the present disclosure. In FIG. 8, pilot signals are carried on the subcarrier adjacent to the ACK/NACK signal subcarrier over the six long blocks. In addition, symbols for the two pilot signals P1 and P2 are also carried on the fA, fB, fC and fD subcarriers in short blocks SB1 and SB2.

Figure 9:
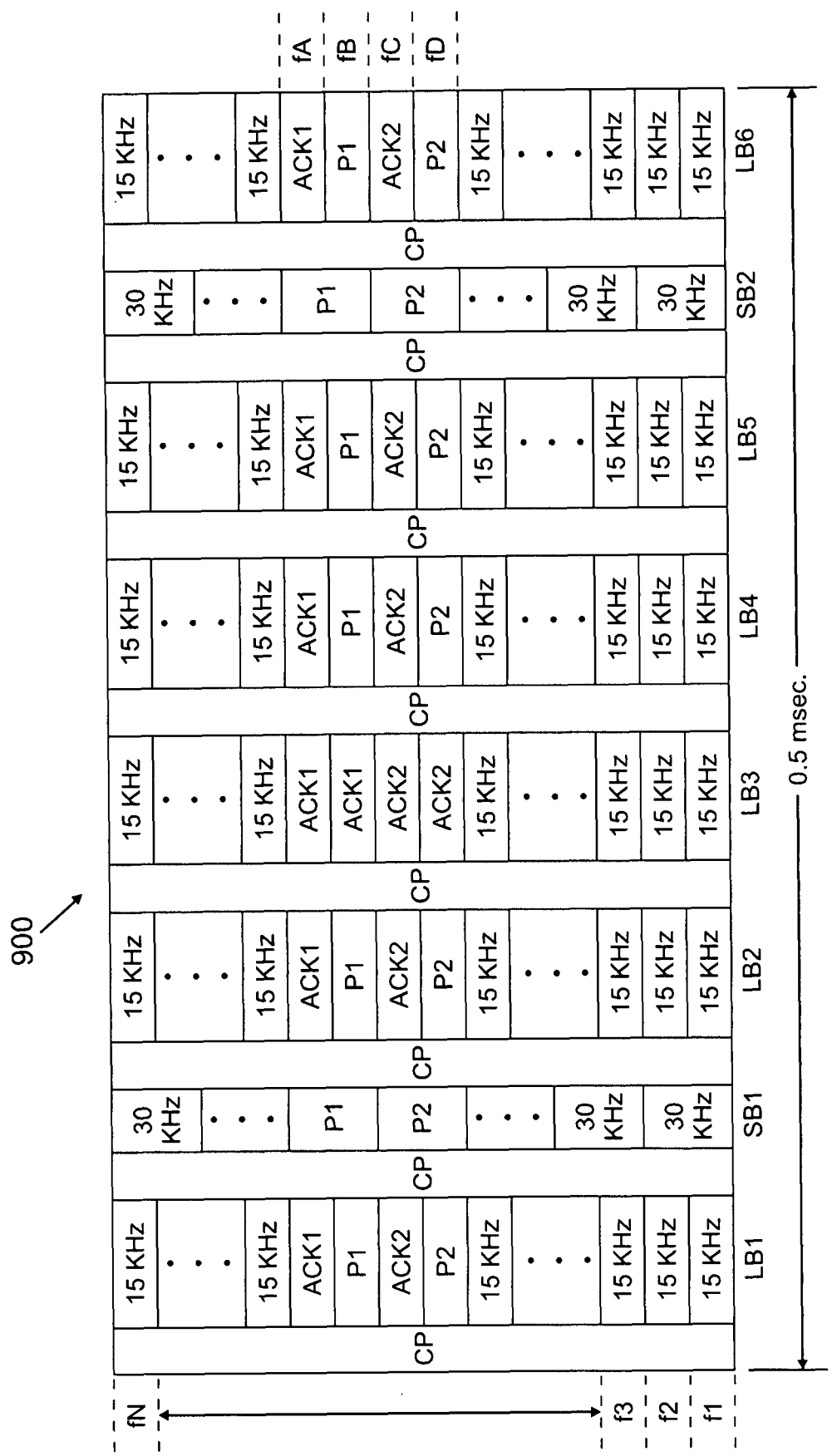
FIG. 9 illustrates an uplink subframe according to another embodiment of the present disclosure.

FIG. 9 illustrates uplink frame 900 according to another embodiment of the present disclosure. FIG. 9 is similar in most respects to FIG. 8, except that pilot signals P1 and P2 are carried on the subcarriers adjacent to the subcarriers for the ACK1 and ACK2 signal in only 5 of the long blocks, namely LB1, LB2, LB4, LB5 and LB6. However, in long block LB5, both pairs of adjacent subcarriers are used for the ACK1 and ACK2 signals. Thus, subcarriers fA and fB carry the ACK1 signal, while subcarriers fC and fD carry the ACK2 signal. This configuration allows for equal distribution of symbols between ACK signals and pilot signals (i.e., 7 symbols for each ACK signal and 7 symbols for each pilot signal).

Figure 10:
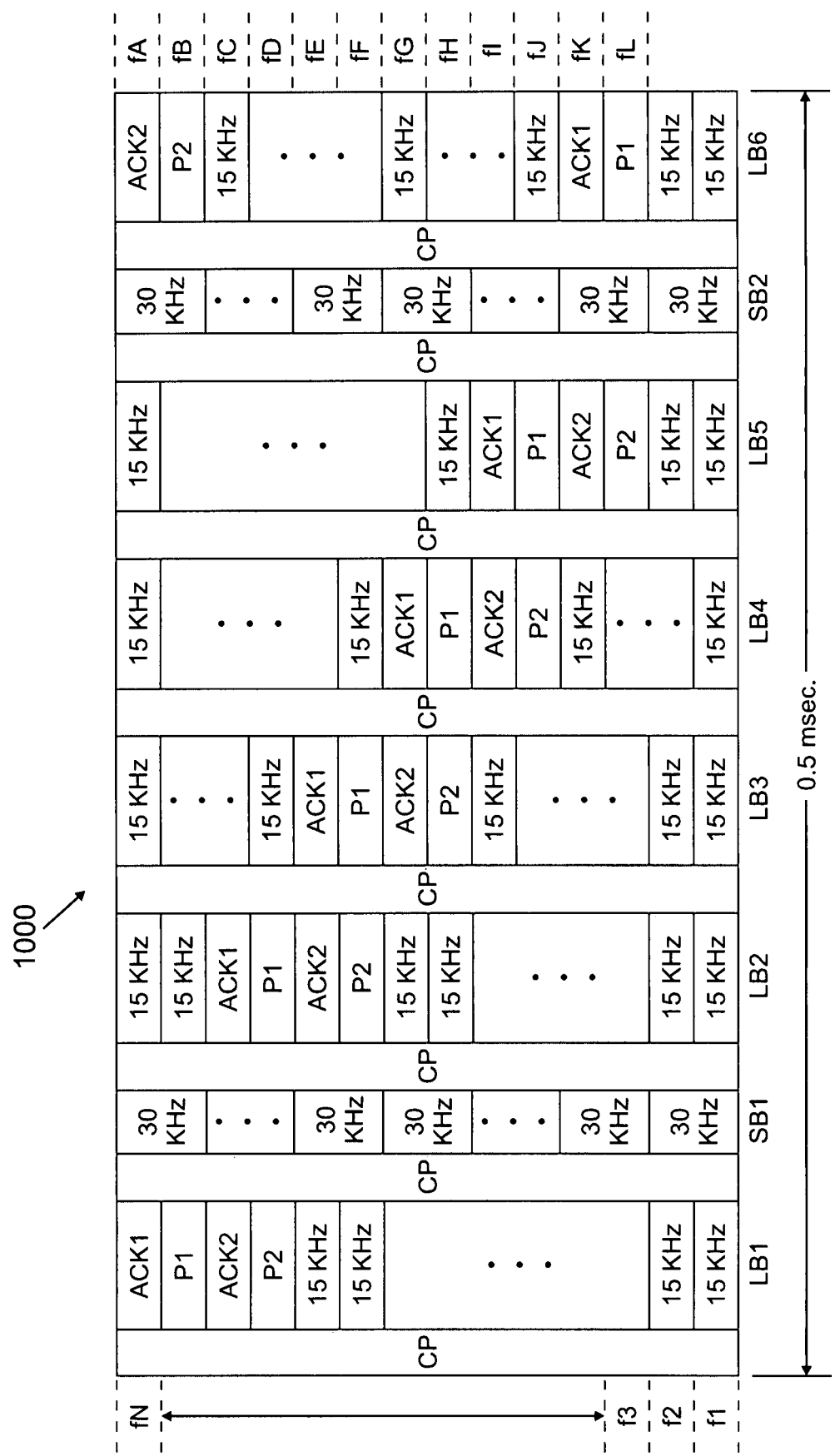
FIG. 10 illustrates an uplink subframe according to another embodiment of the present disclosure.

FIG. 10 illustrates uplink frame 1000 according to another embodiment of the present disclosure. In FIG. 10, the ACK1 and ACK2 signals are uniformly distributed over the whole used bandwidth. This enables wireless network 100 to exploit frequency diversity. As in FIGS. 7-9, the symbols for the pilot signals P1 and P2 are transmitted in subcarriers adjacent to the subcarriers for the ACK1 and ACK2 signals to aid the channel estimation in demodulating the ACK/NACK signals. In FIG. 10, the ACK1 signal and the pilot signal P1 use subcarriers fA and fB in long block LB1, subcarriers fC and fD in long block LB2, subcarriers fE and fF in long block LB3, and so forth. Similarly, the ACK2 signal and the pilot signal P2 use subcarriers fC and fD in long block LB1, subcarriers fE and fF in long block LB1, subcarriers fG and fH in long block LB3, and so forth. The ACK2 signal and the pilot signal P2 use subcarriers fA and fB in long block LB6.

Figure 11:
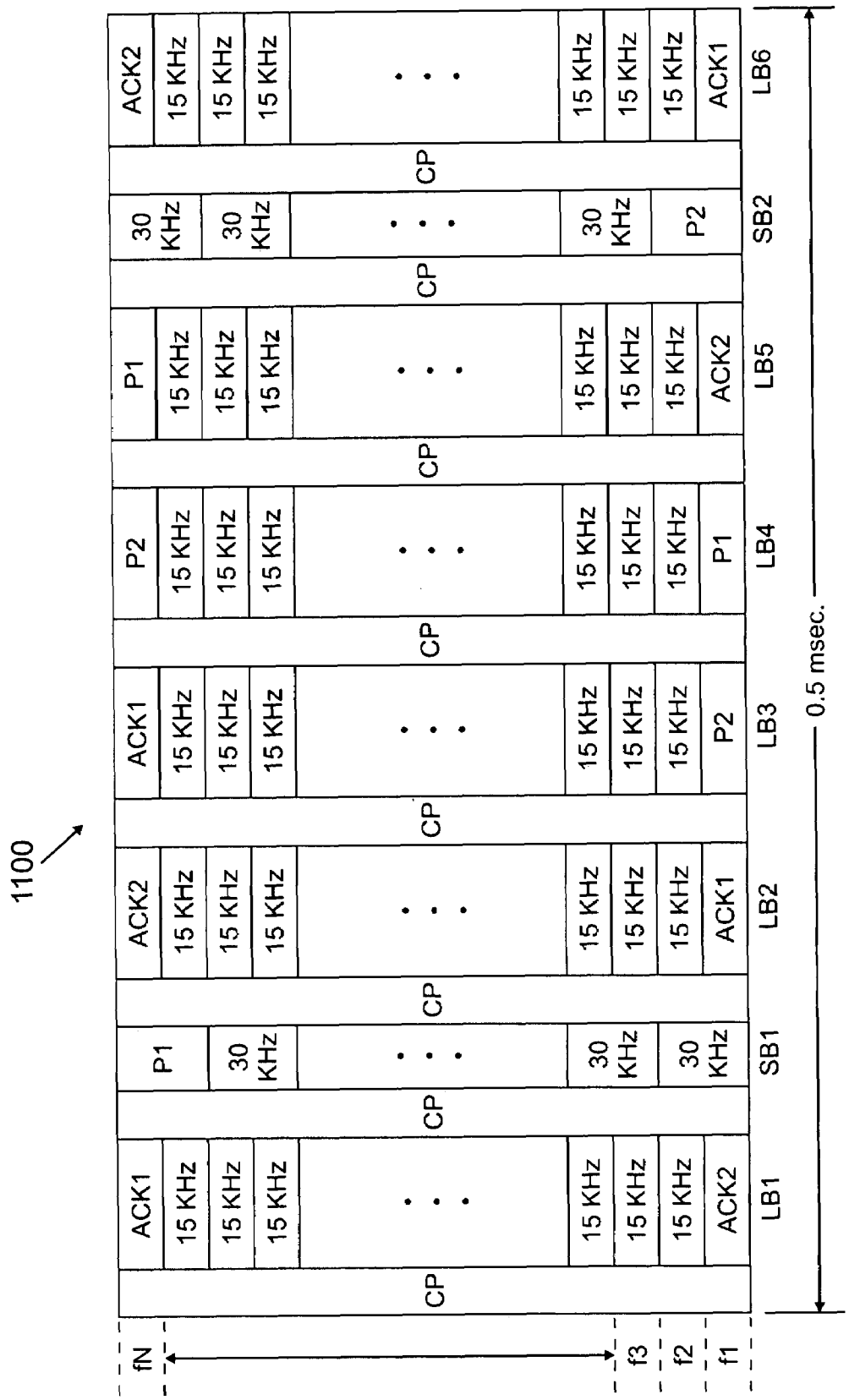
FIG. 11 illustrates an uplink subframe according to another embodiment of the present disclosure.

FIG. 11 illustrates uplink frame 1100 according to another embodiment of the present disclosure. In FIG. 11, the subcarriers used for the ACK/NACK and pilot signals are distributed at the two edges of the used bandwidth. This configuration provides some frequency diversity for the ACK signal while leaving contiguous bandwidth in the middle for other control and data channels.

By way of example, subcarrier f1 is used by the ACK1 signal in long blocks LB2 and LB6, the ACK2 signal in long blocks LB1 and LB5, the pilot signal P1 in long block LB4, and the pilot signal P2 in long block LB3. Also, in short block SB2, the first 30 KHz subcarrier carries the pilot signal P2 using the same spectrum as subcarriers f1 and f2. Similarly, subcarrier fN is used by the ACK1 signal in long blocks LB1 and LB3, the ACK2 signal in long blocks LB2 and LB6, the pilot signal P1 in long block LB5, and the pilot signal P2 in long block LB4. Also, in short block SB1, the last 30 KHz subcarrier carries the pilot signal P1 using the same spectrum as subcarriers f(N−1) and fN.

Figure 12:
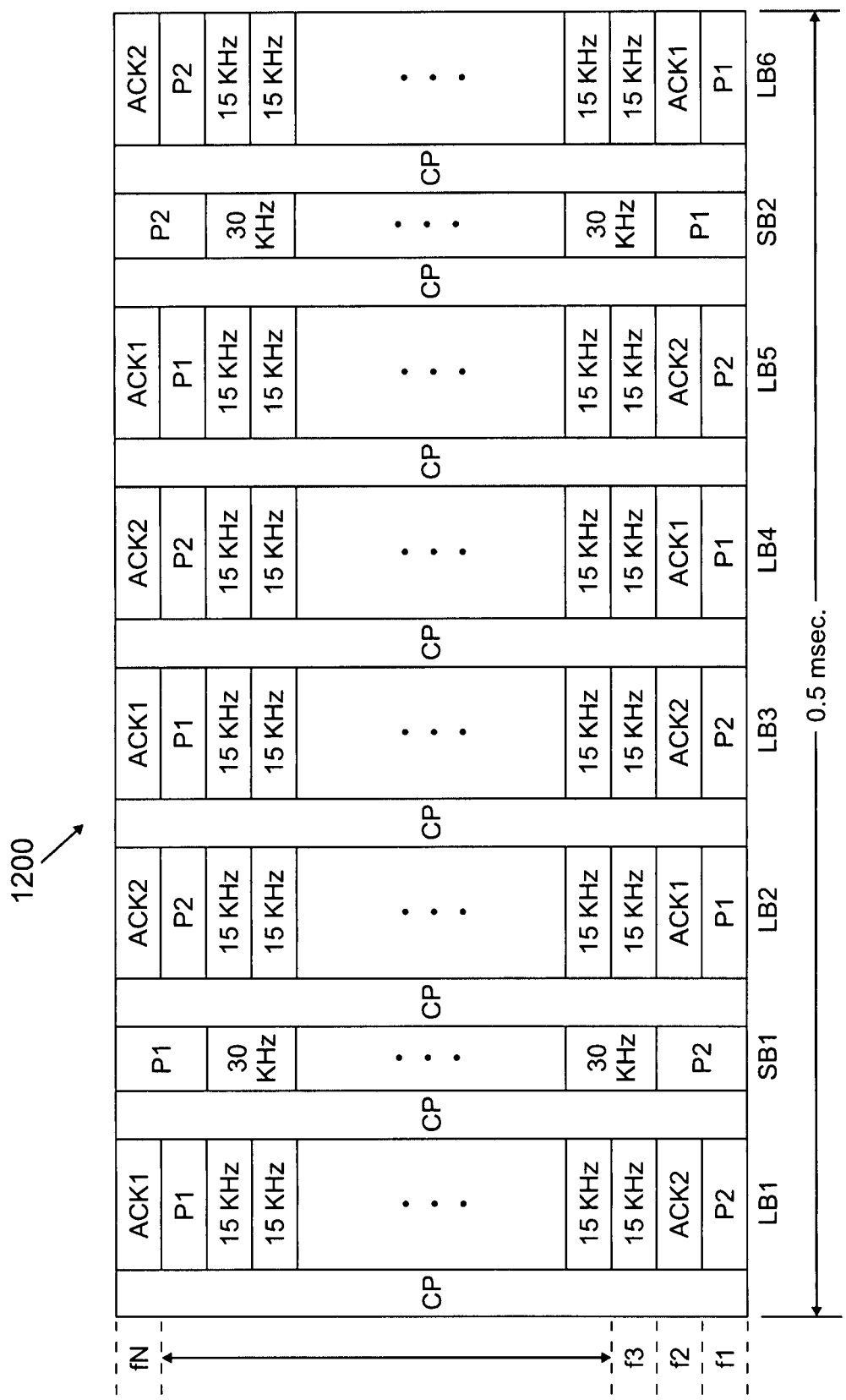
FIG. 12 illustrates an uplink subframe according to another embodiment of the present disclosure.

FIG. 12 illustrates uplink frame 1200 according to another embodiment of the present disclosure. In FIG. 12, as in FIG. 11, the ACK/NACK and pilot signals are again distributed at the two edges of the used bandwidth. However, the pilot signals are transmitted in subcarriers adjacent to the ACK/NACK subcarriers in long blocks LB1-LB6.

Figure 13:
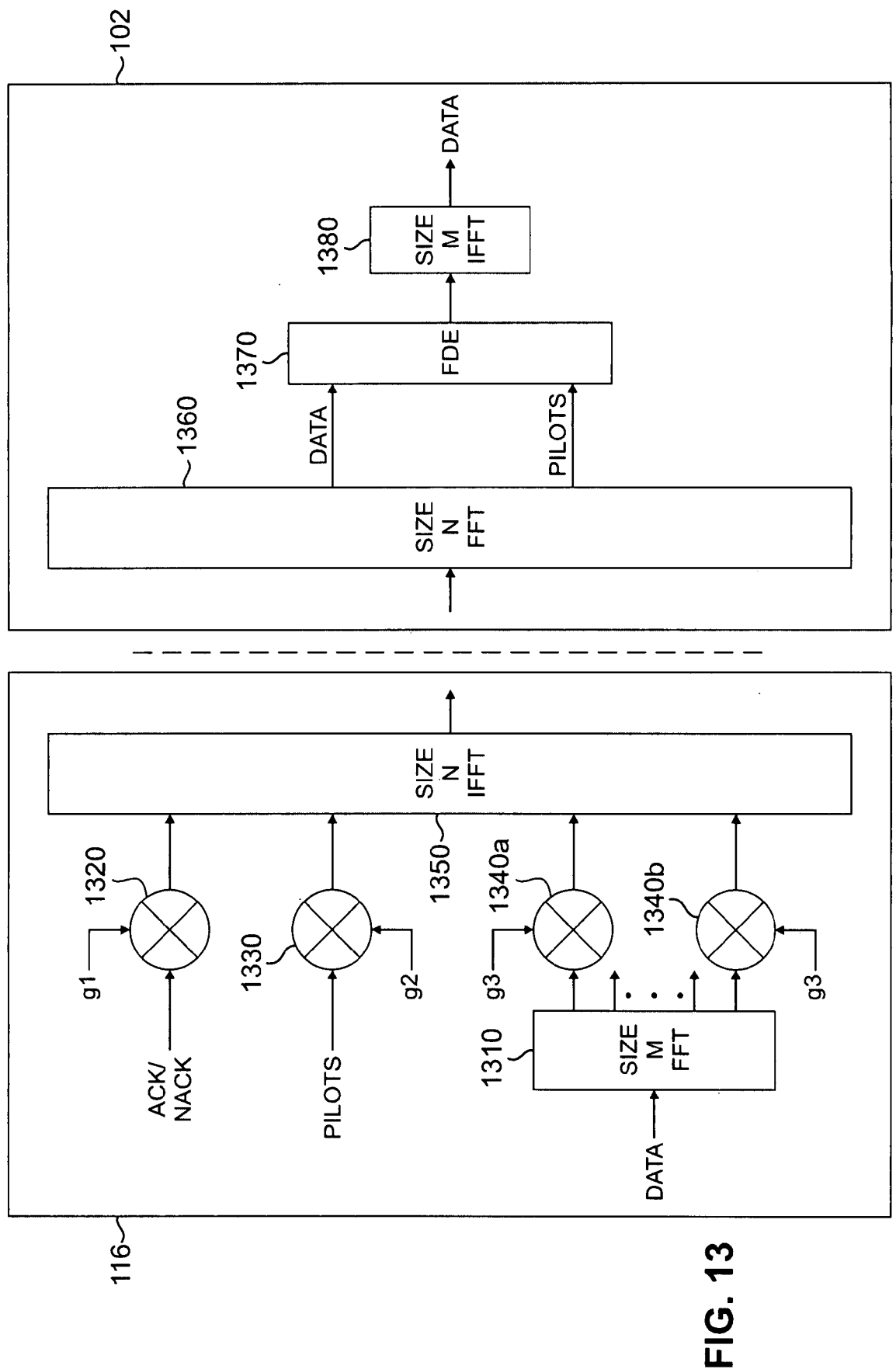
FIG. 13 illustrates selected portions of an exemplary base station and an exemplary subscriber station according to another embodiment of the present disclosure.

FIG. 13 illustrates selected portions of exemplary base 102 station and exemplary subscriber station 116 according to another embodiment of the present disclosure. A DFT-spread OFDM system is attractive for the uplink (i.e., subscriber station to base station) of a wireless system due to its low peak-to-average power (PAPR) characteristic. This compensates for the limited transmit power available in a subscriber station. A low PAPR enables a lower power amplifier back off and allows the subscriber station to transmit at a higher power and higher data rate, thereby improving the coverage and spectral efficiency of a wireless network.

In FIG. 13, subscriber station (SS) 116 comprises size M FFT block 1310, ACK/NACK amplifier 1320, pilot amplifier 1330, M data amplifiers, including amplifiers 1340a and 1340b, and size N IFFT block 1350. Base station (BS) 102 comprises size N FFT block 1360, frequency domain equalization (FDE) block 1370, and size M IFFT block 1380. DFT-spread OFDM systems similar to FIG. 13 were disclosed in U.S. patent application Ser. No. 11/374,928, which was incorporated by reference above.

In a DFT-spread OFDM system, the coded modulation data symbols are FFT pre-coded by size M FFT clock 1310 before mapping at the input of size N IFFT block 1350. The FFT pre-coded outputs of size M IFFT block 1310 may then be scaled by a gain factor, g3, by the M amplifiers 1340. ACK/NACK amplifier 1320 applies a gain factor, g1, to the ACK/NACK signals and pilot amplifier 1330 applies a gain factor, g2, to the pilot signals. In an exemplary embodiment of the disclosure, gain factors g1, g2 and g3 may have different values.

At BS 102, size N FFT block 1360 recovers the data symbols and the pilot symbols. FDE block 1370 performs frequency-domain equalization after the FFT operation. Size M IFFT block 1380 then performs an IFFT operation on the equalized symbols in order to obtain the data modulation symbols that were FFT pre-coded in SS 116.

The frequency-multiplexed approach for the ACK/NACK signals, the pilot signals, and the user data allows for different gain factors and power allocations to these different signals. This provides the ability to control the reliability of the ACK/NACK channel according to the desired bit error rate (BER) requirement.

In FIGS. 1-12 above, it has generally been assumed that the ACK1 and ACK 2 signals provided only a single-bit ACK/NACK feedback. However, the principles of present disclosure also apply when multi-bit ACK/NACK feedback is required, such as in MIMO multi-codeword embodiment. In this case, it is also possible to perform channel coding on multiple ACK/NACK bits before mapping to subcarriers/symbols.

In an advantageous embodiment of the disclosure, main controller and scheduler 235 in BS 102 is capable of performing hybrid ARQ ACK/NACK feedback scheduling based on the ACK/NACK channel signal quality in an OFDM or DFT-spread OFDM system. This provides ACK/NACK signal reception at a higher signal level and improves the reliability of the hybrid ARQ feedback. The scheduling of ACK/NACK channels according to the principles of the present disclosure reduces inter-cell interference and improves overall system capacity and throughput.

In a frequency-selective channel environment, a first subscriber station (e.g., SS 116) may experience better signal quality transmitting in a first group of time-frequency slots than a second subscriber station (e.g., SS 115), while the second subscriber station may experience better signal quality transmitting in a different second group of time-frequency slots than the first subscriber station. This difference in channel quality applies to ACK/NACK channels as well as user traffic channels.

In these conditions, the overall ACK/NACK signal quality may be improved if the hybrid ARQ ACK/NACK feedback messages transmitted by SS 116 are selectively scheduled in time-frequency slots of ACK/NACK channels where SS 116 experiences better signal quality than SS 115 and if the hybrid ARQ ACK/NACK feedback messages transmitted by SS 115 are selectively scheduled in time-frequency slots of ACK/NACK channels where SS 115 experiences better signal quality than SS 116. Advantageously, the same technique may be applied to a single subscriber station that uses multiple antennas (e.g., MIMO antenna array) to transmit multiple data streams in the uplink. The base station may schedule a first antenna of a first subscriber station to transmit a first ACK/NACK message in a first group of time-frequency slots and may schedule a second antenna of the first subscriber station to transmit a second ACK/NACK message in a second group of time-frequency slots.

Figure 14:
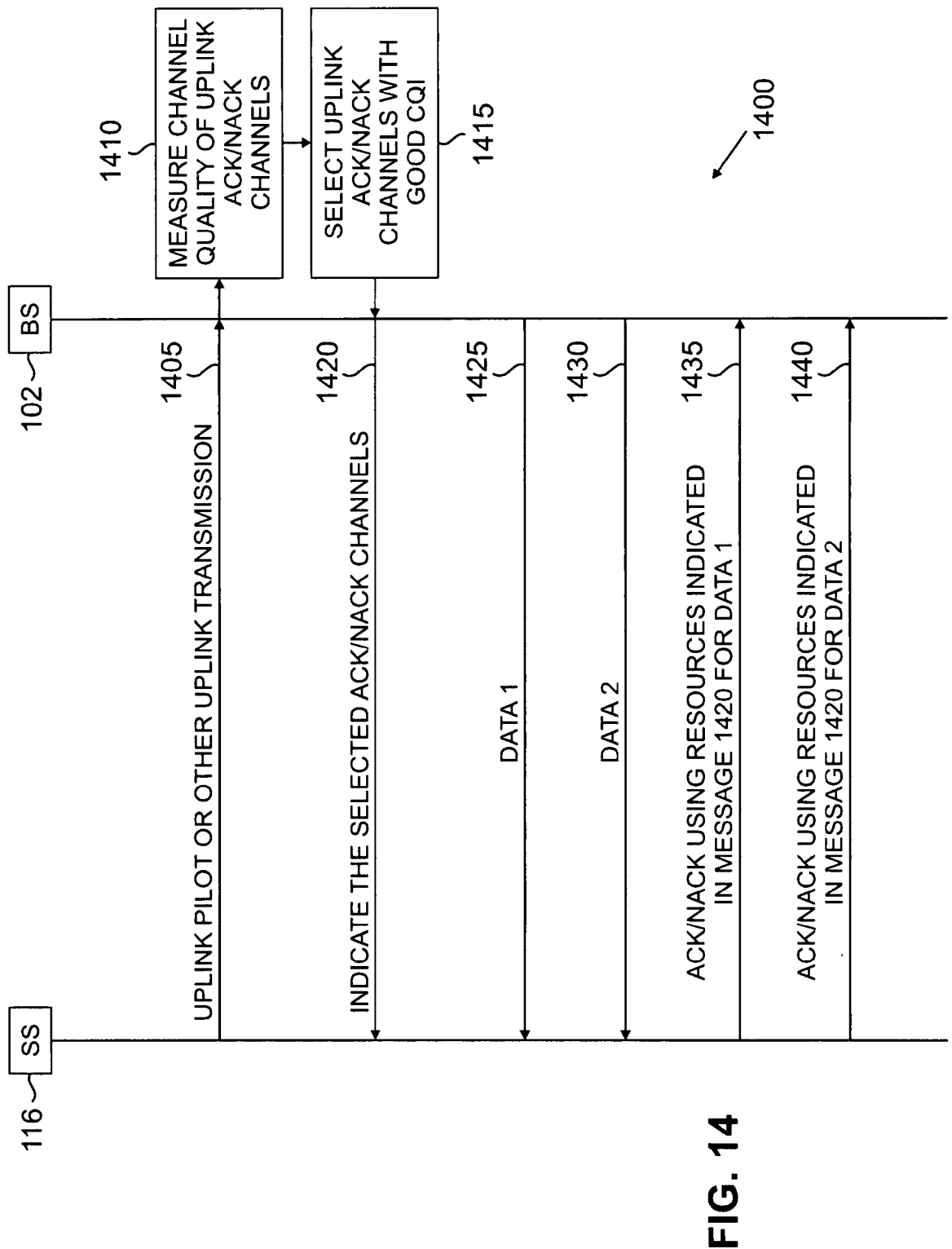
FIG. 14 is a flow diagram illustrating the scheduling of ACK/NACK messages in the uplink according to one embodiment of the present disclosure.

FIG. 14 depicts flow diagram 1400, which illustrates the scheduling of ACK/NACK messages in the uplink according to one embodiment of the present disclosure. Initially, BS 102 receives uplink pilot signals or other uplink signals (e.g., data traffic) from a plurality of transmit antennas (e.g., 2 antennas) used by SS 116 (process step 1405). BS 102 measures the channel quality of the ACK/NACK channels in the uplink subframe by any conventional means, including, for example, measuring the signal-to-interference and noise ratio (SINR) of the uplink pilots. BS 102 then determines a channel quality indicator (CQI) value for selected time-frequency slots in the uplink subframe (process step 1410). In the exemplary embodiment, BS 102 may measure the channel quality of a first pilot signal transmitted from a first antenna by SS 116 and may measure the channel quality of a second pilot signal transmitted from a second antenna by SS 116. From this information, BS 101 can determine for each antenna of SS 116 which time-frequency slots used as ACK/NACK channels in the uplink subframe are experiencing good channel conditions and which time-frequency slots are experiencing poor channel conditions.

Next, BS 102 selects one or more uplink ACK/NACK channels for each antenna according to the channel quality indicator (CQI) values previously determined. Each antenna is scheduled to use one or more ACK/NACK channels having a good CQI value for that antenna (process step 1415). BS 102 then transmits control channel messages containing ACK/NACK Resource Indication values (as described in FIG. 4 above) that indicate to SS 116 the selected ACK/NACK channels to be used by each antenna to transmit an ACK message or a NACK message (process step 1420). BS 102 then transmits a first data packet (Data 1) and a second data packet (Data 2) to SS 116 (process steps 1425 and 1430).

SS 116 processes the Data 1 and Data 2 packets to determine whether the Data 1 and Data 2 packets were received without error (ACK condition) or with error(s) (NACK condition). SS 116 then transmits an ACK or NACK message for the Data 1 packet from the first antenna using the ACK/NACK resources (i.e., subcarriers and time slots) in the uplink subframe that were indicated in message/step 1420 (process step 1435). SS 116 also transmits an ACK or NACK message for the Data 2 packet from the second antenna using the ACK/NACK resources (i.e., subcarriers and time slots) in the uplink subframe that were indicated in message/step 1420 (process step 1440).

Advantageously, BS 102 may schedule the different ACK/NACK channels on spaced frequencies so that the ACK/NACK channels experience relatively independent channel quality in a frequency selective environment. The ACK/NACK channels may be distributed across the whole subframe as shown in FIGS. 6-12, or only over part of the subframe in a time-multiplexed fashion as shown in prior art FIG. 4. The number of ACK/NACK channels needed with this dynamic allocation should be equal to the maximum number of users that can be scheduled simultaneously within a downlink subframe.

Figure 15:
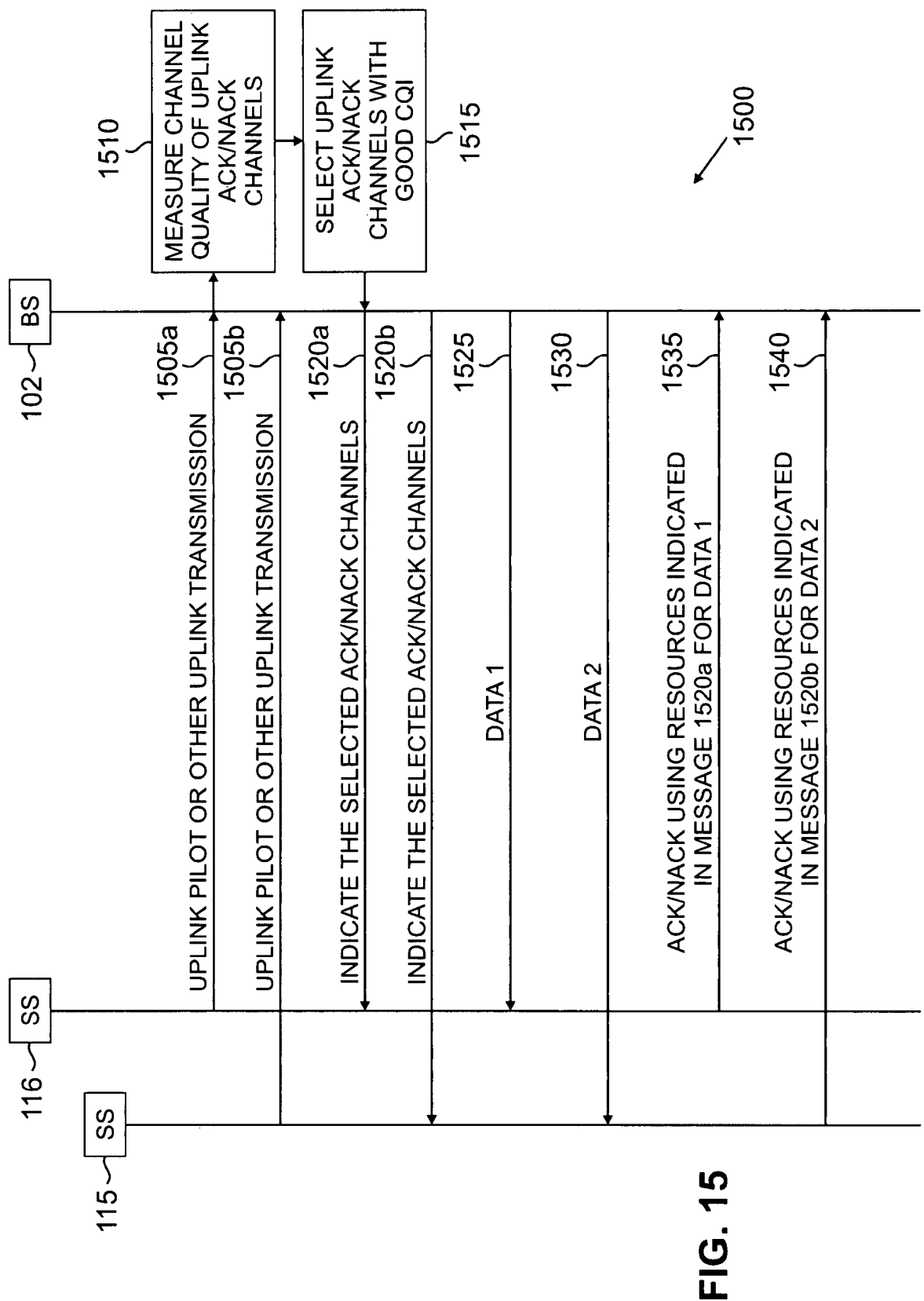
FIG. 15 is a flow diagram illustrating the scheduling of ACK/NACK messages in the uplink according to another embodiment of the present disclosure.

FIG. 15 depicts flow diagram 1500, which illustrates the scheduling of ACK/NACK messages in the uplink according to another embodiment of the present disclosure. In FIG. 14, BS 102 provided scheduling of ACK/NACK message transmissions from multiple antennas of a single subscriber station. In FIG. 15, BS 102 provides scheduling of ACK/NACK message transmissions from multiple subscriber stations, namely SS 116 and SS 115.

Initially, BS 102 receives uplink pilot signals or other uplink signals in an uplink frame from SS 116 and SS 115 (process steps 1505*a* and 1505*b*). As in FIG. 14, BS 102 measures the channel quality of the ACK/NACK channels in the uplink subframe by any conventional means, including, for example, measuring signal-to-interference and noise ratio (SINR) of the uplink pilots. BS 102 then determines a channel quality indicator (CQI) value for selected time-frequency slots in the uplink subframe (process step 1510). In the exemplary embodiment, BS 102 may measure the channel quality of a first pilot signal transmitted from SS 116 and may measure the channel quality of a second pilot signal transmitted from SS 115. From this information, BS 101 can determine for each of SS 116 and SS 115 which time-frequency slots used as ACK/NACK channels in the uplink subframe are experiencing good channel conditions and which time-frequency slots are experiencing poor channel conditions.

Next, BS 102 selects one or more uplink ACK/NACK channels for each of SS 115 and SS 116 according to the channel quality indicator (CQI) values previously determined. Each of SS 115 and SS 116 are scheduled to use one or more ACK/NACK channels having a good CQI value for that subscriber station (process step 1515). BS 102 then transmits control channel messages containing ACK/NACK Resource Indication values (as described in FIG. 4 above) that indicate to SS 116 and SS 115 the selected ACK/NACK channels to be used to transmit an ACK message or a NACK message (process steps 1520*a* and 1520*b*). Advantageously, the two messages shown in process steps 1520*a* and 1520*b* may be combined into a single message/step 1520 that is transmitted by BS 102.

BS 102 then transmits a first data packet (Data 1) to SS 116 and a second data packet (Data 2) to SS 115 (process steps 1525 and 1530). SS 116 processes the Data 1 packet to determine whether the Data 1 packet was received without error (ACK condition) or with error(s) (NACK condition). SS 115 similarly processes the Data 2 packet to determine whether the Data 2 packet was received without error or with error(s). SS 116 then transmits an ACK or NACK message for the Data 1 packet using the ACK/NACK resources (i.e., subcarriers and time slots) in the uplink subframe that were indicated in message/step 1520*a* (process step 1535). SS 115 also transmits an ACK or NACK message for the Data 2 packet using the ACK/NACK resources (i.e., subcarriers and time slots) in the uplink subframe that were indicated in message/step 1520*b* (process step 1540).

Figure 16:
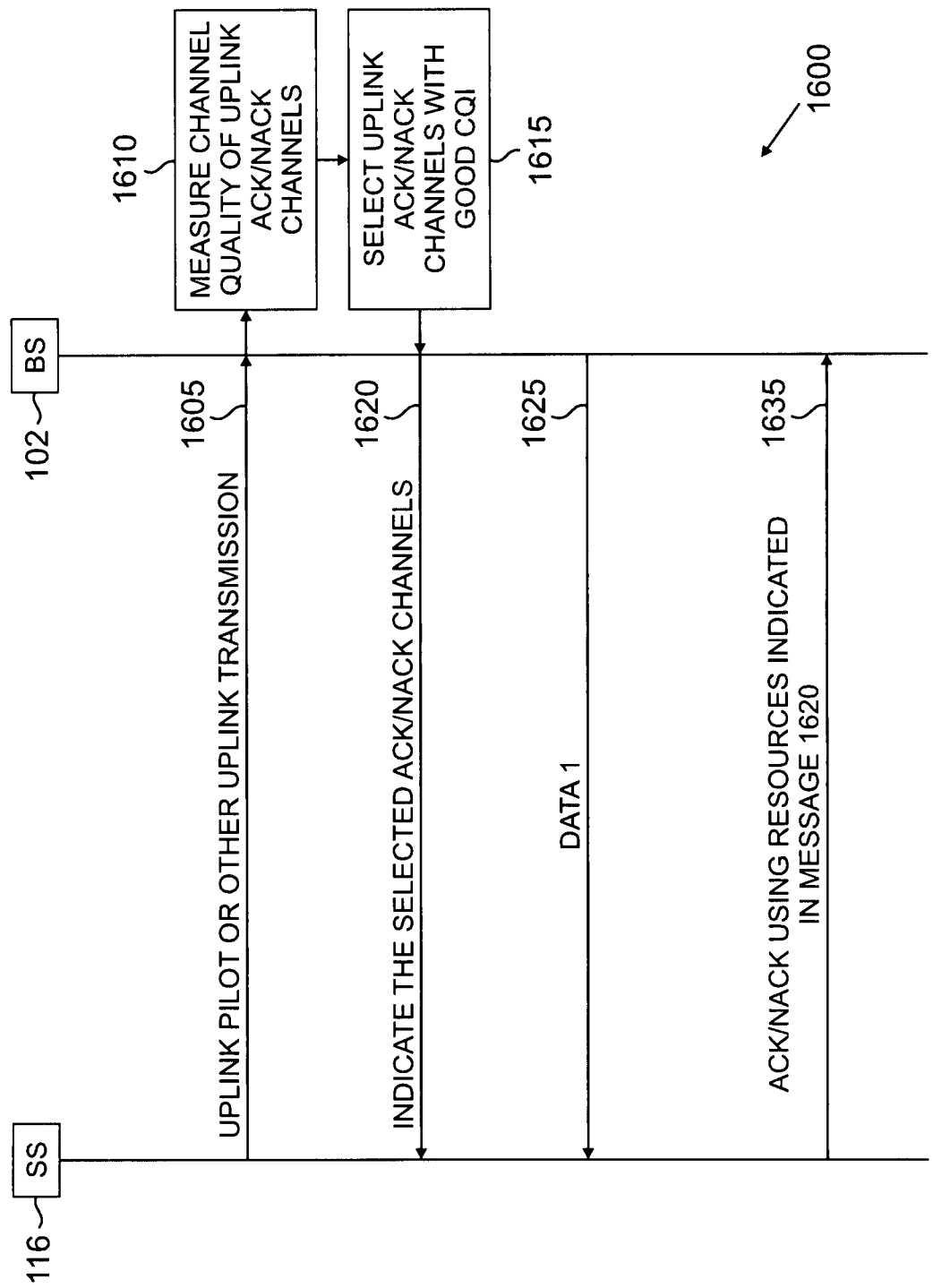
FIG. 16 is a flow diagram illustrating the scheduling of ACK/NACK messages in the uplink according to one embodiment of the present disclosure.

FIG. 16 depicts flow diagram 1600, which illustrates the scheduling of ACK/NACK messages in the uplink according to one embodiment of the present disclosure. Initially, BS 102 receives uplink pilot signals or other uplink signals (e.g., data traffic) from by SS 116 (process step 1605). BS 102 measures the channel quality of the ACK/NACK channels in the uplink subframe by any conventional means, including, for example, measuring the signal-to-interference and noise ratio (SINR) of the uplink pilots. BS 102 then determines a channel quality indicator (CQI) value for selected time-frequency slots in the uplink subframe (process step 1610). In the exemplary embodiment, BS 102 may measure the channel quality of a pilot signal transmitted by SS 116. From this information, BS 102 can determine which time-frequency slots used as ACK/NACK channels in the uplink subframe are experiencing good channel conditions and which time-frequency slots are experiencing poor channel conditions.

Next, BS 102 selects one or more uplink ACK/NACK channels according to the channel quality indicator (CQI) values previously determined. SS 116 is scheduled to use one or more ACK/NACK channels having a good CQI value (process step 1615). BS 102 then transmits control channel messages containing ACK/NACK Resource Indication values (as described in FIG. 4 above) that indicate to SS 116 the selected ACK/NACK channels to be used to transmit an ACK message or a NACK message (process step 1620). BS 102 then transmits a data packet (Data 1) to SS 116 (process steps 1625).

SS 116 processes the Data 1 packets to determine whether the Data 1 packets were received without error (ACK condition) or with error(s) (NACK condition). SS 116 then transmits an ACK or NACK message for the Data 1 packet using the ACK/NACK resources (i.e., subcarriers and time slots) in the uplink subframe that were indicated in message/step 1620 (process step 1635).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station that communicates with a plurality of subscriber stations according to a multicarrier protocol,
wherein the base station is configured to receive uplink signals transmitted by the plurality of subscriber stations and to measure therein a channel quality of each of a plurality of uplink acknowledgment signal channels,
wherein the base station is further configured to transmit a first control message to a first one of the plurality of subscriber stations, the first control message comprising a first acknowledgment resource indication that indicates both a first antenna and a first selected one of the uplink acknowledgment signal channels for transmitting a first acknowledgment signal by the first subscriber station based on a first measured channel quality associated with the first selected uplink acknowledgment signal channel, and
wherein the base station is further configured to transmit a second control message to the first subscriber station, the second control message comprising a second acknowledgment resource indication that indicates both a second antenna and a second selected one of the uplink acknowledgment signal channels for transmitting a second acknowledgment signal by the first subscriber station based on a second measured channel quality associated with the second selected uplink acknowledgment signal channel.

2. The base station as set forth in claim 1, wherein the base station receives an uplink subframe comprising a plurality of blocks, each of the blocks comprising up to N subcarriers transmitted by the plurality of subscriber stations, and wherein the first acknowledgment signal transmitted by the first subscriber station is carried on at least one selected subcarrier in a first block of the uplink subframe and on at least one selected subcarrier in a second block of the uplink subframe.

3. The base station as set forth in claim 2, wherein the at least one selected subcarrier in the first block of the uplink subframe is the same as the at least one selected subcarrier in the second block of the uplink subframe.

4. The base station as set forth in claim 2, wherein the at least one selected subcarrier in the first block of the uplink subframe is different than the at least one selected subcarrier in the second block of the uplink subframe.

5. The base station as set forth in claim 1, wherein the base station is further configured to transmit to a second one of the plurality of subscriber stations a second control message, the second control message comprising a second acknowledgment resource indication that indicates a second selected one of the uplink acknowledgment signal channels for transmitting a second acknowledgment signal by the second subscriber station based on a second measured channel quality associated with the second selected uplink acknowledgment signal channel.

6. The base station as set forth in claim 5, wherein the base station receives an uplink subframe comprising a plurality of blocks, each of the blocks comprising up to N subcarriers transmitted by the plurality of subscriber stations, and wherein the first acknowledgment signal transmitted by the first subscriber station is carried on at least one selected subcarrier in a first block of the uplink subframe and on at least one selected subcarrier in a second block of the uplink subframe.

7. The base station as set forth in claim 6, wherein the at least one selected subcarrier in the first block of the uplink subframe is the same as the at least one selected subcarrier in the second block of the uplink subframe.

8. The base station as set forth in claim 6, wherein the at least one selected subcarrier in the first block of the uplink subframe is different than the at least one selected subcarrier in the second block of the uplink subframe.

9. A first communication device configured to transmit in a forward channel to a second communication device and receive multicarrier signals in a reverse channel from other communication devices, the reverse channel comprising a plurality of time slots, each of the time slots comprising up to N subcarriers transmitted by the other communication devices,
wherein the first communication device is configured to measure a channel quality of each of a plurality of acknowledgment signals transmitted by the other communication devices,
wherein the first communication device is further configured to transmit a control message to the second communication device, the control message comprising an acknowledgment resource indication that indicates both a first antenna and a first selected subcarrier in a first time slot of a reverse channel for transmitting a first acknowledgment signal by the second communication device and that indicates both a second antenna and a second selected subcarrier in a second time slot of the reverse channel for transmitting a second acknowledgment signal by the second communication device, wherein the first selected subcarrier in the first time slot and the second selected subcarrier in the second time slot of the reverse channel are selected based on a measured channel quality associated with the first and second selected subcarriers, the first selected subcarrier in the first time slot being the same as the second selected subcarrier in the second time slot.

10. A base station configured to receive in an uplink channel an uplink subframe comprising orthogonal frequency division multiple access (OFDMA) subcarriers transmitted by a plurality of subscriber stations in a plurality of long time slots and a plurality of short time slots of the uplink subframe, wherein each of the long time slots comprises up to N OFDMA subcarriers transmitted by the plurality of subscriber stations, wherein the base station is configured to measure a quality of each of a plurality of pilot signals in the uplink subframe and is further configured to transmit a first control message to a first one of the plurality of subscriber stations, the first control message comprising a first acknowledgment resource indication that indicates a first selected OFDMA subcarrier in a first long time slot of the uplink subframe and on a second selected OFDMA subcarrier in a second long time slot of the uplink subframe for transmitting a first acknowledgment signal by the first subscriber station, wherein the base station is further configured to transmit a second control message to the first subscriber station, the second control message comprising a second acknowledgment resource indication that indicates a third selected OFDMA subcarrier in a third long time slot of the uplink subframe and on a fourth selected OFDMA subcarrier in a fourth long time slot of the uplink subframe for transmitting a second acknowledgment signal by the first subscriber station, wherein the first and second selected OFDMA subcarriers are selected by the base station based on the measured quality associated with at least one of the plurality of pilot signals, and wherein the first and second acknowledgment signals are received from different antennas of the first subscriber station.

11. The base station as set forth in claim 10, wherein the first selected OFDMA subcarrier in the first long time slot is the same as the second selected subcarrier in the second long time slot.

12. The base station as set forth in claim 10, wherein the first selected OFDMA subcarrier in the first long time slot is different than the second selected subcarrier in the second long time slot.

13. A method of communicating with selected ones of a plurality of subscriber stations according to a multicarrier protocol, the method comprising:

receiving in a base station uplink signals transmitted by the plurality of subscriber stations;

measuring a channel quality of each of a plurality of uplink acknowledgment signal channels;

transmitting from the base station to a first one of the plurality of subscriber stations a first control message, the first control message comprising a first acknowledgment resource indication that indicates a first selected one of the uplink acknowledgment signal channels for transmitting a first acknowledgment signal by the first subscriber station, wherein the first selected uplink acknowledgment signal channel is selected based on a first measured channel quality associated with the first selected uplink acknowledgment signal channel; and transmitting from the base station to the first subscriber station a second control message, the second control message comprising a second acknowledgment resource indication that indicates a second selected one of the uplink acknowledgment signal channels for transmitting a second acknowledgment signal by the first subscriber station, wherein the second selected uplink acknowledgment signal channel is selected based on a second measured channel quality associated with the second selected uplink acknowledgment signal channel, wherein the first acknowledgment signal is received from a first antenna of the first subscriber station and the second acknowledgment signal is received from a second antenna of the first subscriber station.

14. The method as set forth in claim 13, wherein receiving uplink signals in the base station comprises receiving an uplink subframe comprising a plurality of blocks, each of the blocks comprising up to N subcarriers transmitted by the plurality of subscriber stations, wherein the first acknowledgment signal transmitted by the first subscriber station is carried on at least one selected subcarrier in a first block of the uplink subframe and on at least one selected subcarrier in a second block of the uplink subframe.

15. The method as set forth in claim 14, wherein the at least one selected subcarrier in the first block of the uplink subframe is the same as the at least one selected subcarrier in the second block of the uplink subframe.

16. The method as set forth in claim 14, wherein the at least one selected subcarrier in the first block of the uplink subframe is different than the at least one selected subcarrier in the second block of the uplink subframe.

17. A method of communicating between a first communication device and a second communication device according to a multicarrier protocol, the method comprising:

receiving in the first communication device multicarrier signals transmitted from other communication devices in a reverse channel, the reverse channel comprising a plurality of time slots, each of the time slots comprising up to N subcarriers transmitted by the other communication devices;

measuring in the first communication device a channel quality of each of a plurality of acknowledgment signals transmitted by the other communication devices; and transmitting from the first communication device to the second communication device a control message, the control message comprising an acknowledgment resource indication that indicates both a first antenna and a first selected subcarrier in a first time slot of the reverse channel for transmitting a first acknowledgment signal by the second communication device and that indicates both a second antenna and a second selected subcarrier in a second time slot of the reverse channel for transmitting a second acknowledgment signal by the second communication device.

18. The method as set forth in claim 17, wherein the first selected subcarrier in the first time slot and the second selected subcarrier in the second time slot of the reverse channel are selected based on a measured channel quality associated with the first and second selected subcarriers.

19. The method as set forth in claim 18, wherein the first selected subcarrier in the first time slot of the reverse channel is the same as the second selected subcarrier in the second time slot of the reverse channel.

20. The method device as set forth in claim 18, wherein the first selected subcarrier in the first time slot of the reverse channel is different than the second selected subcarrier in the second time slot of the reverse channel.

21. A method of a base station communicating with a first one of a plurality of subscriber stations according to an orthogonal frequency division multiple access (OFDMA) protocol, the method comprising:

receiving in the base station an uplink subframe comprising OFDMA subcarriers transmitted by the plurality of subscriber stations in a plurality of long time slots and a plurality of short time slots of the uplink subframe, wherein each of the long time slots comprises up to N OFDMA subcarriers transmitted by the plurality of subscriber stations;

measuring a quality of each of a plurality of pilot signals in the uplink subframe;

transmitting from the base station to the first subscriber station a first message, the first control message comprising a first acknowledgment resource indication that indicates a first selected OFDMA subcarrier in a first long time slot of the uplink subframe and a second selected OFDMA subcarrier in a second long time slot of the uplink subframe for transmitting a first acknowledgment signal by the first subscriber station, wherein the first and second selected OFDMA subcarriers are selected by the base station based on the measured quality associated with at least one of the plurality of pilot signals; and transmitting from the base station to the first subscriber station a second message, the second control message comprising a second acknowledgment resource indication that indicates a third selected OFDMA subcarrier in a third long time slot of the uplink subframe and a fourth selected OFDMA subcarrier in a fourth long time slot of the uplink subframe for transmitting a second acknowledgment signal by the first subscriber station, wherein the first and second acknowledgment signals are received from different antennas of the first subscriber station.

22. The method as set forth in claim 21, wherein the first selected OFDMA subcarrier in the first long time slot is the same as the second selected subcarrier in the second long time slot.

23. The method as set forth in claim 21, wherein the first selected OFDMA subcarrier in the first long time slot is different than the second selected subcarrier in the second long time slot.

\* \* \* \* \*